United States Patent
Kim (10) Patent No.: US 6,336,145 B2
(45) Date of Patent: Jan. 1, 2002

(54) INTERPROCESSOR COMMUNICATION INTERFACE WITH MESSAGE UNIT COUPLED TO NEXT INTERFACE AND TO INTERNAL RECEIVE AND SEND BUFFER

(75) Inventor: Young-Il Kim, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/729,244

(22) Filed: Dec. 5, 2000

Related U.S. Application Data (62) Division of application No. 09/166,232, filed on Oct. 5, 1998, now Pat. No. 6,226,706.

(30) Foreign Application Priority Data

Dec. 29, 1997 (KR) .................................................. 97-76049
Dec. 29, 1997 (KR) .................................................. 97-76050
Jul. 18, 1998 (KR) .................................................. 98-29037

(51) Int. Cl.[7] ................................................. G06F 15/163
(52) U.S. Cl. ........................ 709/250; 709/237; 709/238; 709/251
(58) Field of Search ................................. 709/237, 238, 709/250, 251

(56) References Cited

U.S. PATENT DOCUMENTS

| | | | | |
|---|---|---|---|---|
| 5,617,537 A | * | 4/1997 | Yamada et al. | 709/214 |
| 5,841,988 A | * | 11/1998 | Chennubhotla et al. | 709/237 |
| 5,970,232 A | * | 10/1999 | Passint et al. | 709/238 |
| 5,983,269 A | * | 11/1999 | Mattson et al. | 709/221 |
| 6,078,733 A | * | 6/2000 | Osborne | 709/250 |

* cited by examiner

Primary Examiner—Kenneth S. Kim
(74) Attorney, Agent, or Firm—Robert E. Bushnell, Esq.

(57) ABSTRACT

An interprocessor communication device, in which a plurality of processors are interconnected to processor buses for an address signal, a data signal, and a control signal, receiving/outputting handshake signals for transmitting/receiving a message to/from an adjacent processor. A plurality of memory blocks are connected to memory buses for an address signal, a data signal, and a control signal and stores/outputs data upon input of an address signal and a control signal. A rotation bus interface module, connected between the processor buses and the memory buses, switches the memory buses connected to the processor buses in response to handshake signals received from two adjacent processors to allow the processors exclusively to access the memory blocks.

30 Claims, 10 Drawing Sheets

INTERPROCESSOR COMMUNICATION INTERFACE WITH MESSAGE UNIT COUPLED TO NEXT INTERFACE AND TO INTERNAL RECEIVE AND SEND BUFFER

This application is a division of application Ser. No. 09/166,232 filed Oct. 5, 1998 now U.S. Pat. No. 6,226,706.

CLAIM OF PRIORITY

This application makes reference to, incorporates the same herein, and claims all benefits accruing under 35 U.S.C. § 119 from applications entitled Interprocessor Communication System earlier filed in the Korean Industrial Property Office on the $29^{th}$ day of December 1997, and there duly assigned Serial Nos. 76049-1997 and 76050-1997, and on the $18^{th}$ day of July 1998, and there duly assigned Serial No. 29037-1998.

BACKGROUND OF THE INVENTION

1. Technical Field

The present invention relates to an interprocessor communication device in a digital system having at least two processors, and more particularly to an interprocessor communication device with a message passing network allowing rapid transfer of messages between a plurality of processors.

2. Related Art

For high performance and real-time data processing, two or more processor modules can be loaded into a digital system such as a digital data transmission system, a digital switching system, and a network server for processing data from a plurality of clients. Each processor module includes at least one microprocessor.

In order to rapidly process a large amount of digital data, the digital system should be provided with an interprocessor communication (IPC) device for transferring messages between a plurality of processor modules processing elements after their own functions. As is known, interprocessor communication is generally implemented through a shared memory like a dual port random access memory (RAM), but this allows no concurrent access of two processors to data, thus lowering interprocessor communication efficiency.

Exemplars of recent efforts in the art include U.S. Pat. No. 5,787,300 for a Method and Apparatus for Interprocess Communications in a Database Environment issued to Wijaya, U.S. Pat. No. 5,778,429 for a Parallel Processor System Including a Cache Memory Subsystem That Has Independently Addressable Local and Remote Data Areas issued to Sukegawa et al., U.S. Pat. No. 5,745,779 for a Network Subsystem for Parallel Processor System and Network System for Parallel Processor System issued to Katori, U.S. Pat. No. 5,745,778 for an Apparatus and Method for Improved Cpu Affinity in a Multiprocessor System issued to Alfieri, U.S. Pat. No. 4,507,728 for a Data Processing System for Parallel Processing of Different Instructions issued to Sakamoto et al., U.S. Pat. No. 5,742,766 for a Parallel Computing System for Synchronizing Processors by Using Partial Switch Circuits for Broadcasting Messages after Receiving Synchronization Signals and Judging Synchronization Thereof issued to Takeuchi et al., U.S. Pat. No. 5,630,156 for a Process for Parallel Operation of Several Computation Units, Especially in Image Processing, and Corresponding Architecture issued to Privat et al., U.S. Pat. No. 5,287,532 for a Processor Elements Having Multi-byte Structure Shift Register for Shifting Data Either Byte Wise or Bit Wise with Single-bit Output Formed at Bit Positions Thereof Spaced by One Byte issued to Hunt, and U.S. Pat. No. 5,249,301 for a Processing Communication System Having a Plurality of Memories and Processors Couples Through at Least One Feedback Shift Register Provided from Ring Configured Input Stations issued to Keryvel et al.

While these recent efforts provide advantages, I note that they fail to adequately provide an enhanced, efficient interprocessor communication device with a message passing network allowing rapid transfer of messages between a plurality of processors.

SUMMARY OF THE INVENTION

Therefore, an object of the present invention is to provide an interprocessor communication (IPC) device enabling rapid transfer of a data message between processors in a digital system having at least two processors.

Another object of the present invention is to provide an interprocessor communication device having a rotation bus interface module (RBIM) which switches two adjacent processors to memory system buses to mutually transmit a message at high speed.

Still another object of the present invention is to provide an interprocessor communication device in which messages can be rapidly transmitted between a plurality of processors over a message passing network.

To achieve the above objects, there is provided an interprocessor communication device. In the interprocessor communication device, a plurality of processors are connected to processor buses for an address signal, a data signal, and a control signal, and receives/outputs handshake signals for transmitting/receiving a message to/from an adjacent processor. A plurality of memory blocks are connected to memory buses for an address signal, a data signal, and a control signal and stores/outputs data upon input of an address signal and a control signal. A rotation bus interface module, connected between the processor buses and the memory buses, switches the memory buses connected to the processor buses in response to handshake signals received from two adjacent processors to allow the processors exclusively to access the memory blocks.

To achieve these and other objects in accordance with the principles of the present invention, as embodied and broadly described, the present invention provides an apparatus enabling communication between processors, comprising: a plurality of processor units receiving and transmitting address signals, data signals, and control signals; a plurality of memory units storing message data corresponding to said data signals, said storing being in accordance with said address signals and control signals; and an interface unit conveying said message data from a source processor unit selected from among said plurality of processor units to said plurality of memory units and then from said plurality of memory units to a destination processor unit selected from among said plurality of said processor units in accordance with intercommunication signals, said interface unit receiving and transmitting said intercommunication signals from and to said plurality of processor units.

To achieve these and other objects in accordance with the principles of the present invention, as embodied and broadly described, the present invention provides an apparatus enabling communication between processors, comprising: a plurality of processor units receiving and transmitting address signals, data signals, and control signals; a plurality of interface units, each interface unit among said plurality of interface units conveying message data from a source processor unit selected from among said plurality of processor units to a destination processor unit selected from among said plurality of said processor units in accordance with intercommunication signals, said interface unit receiving and transmitting said intercommunication signals from and to said plurality of processor units, said message data corresponding to said data signals, address signals, and control signals, said plurality of interface units including a first interface unit and a second interface unit; a plurality of reporting buffers, each reporting buffer among said plurality of reporting buffers being connected to one processor unit among said plurality of processor units, temporarily storing message data to be output to one interface unit selected from among said plurality of interface units; a plurality of operation buffers, each operation buffer among said plurality of operation buffers being connected to one processor unit among said plurality of processor units, temporarily storing message data received from one interface unit selected from among said plurality of interface units; and a plurality of message passing units, wherein a first message passing unit among said plurality of message passing units is connected to a first reporting buffer and a first operation buffer selected from among said plurality of reporting and operation buffers, said first message passing unit receiving first message data from said first interface unit, transmitting said first message data to one of said first reporting buffer, said first operation buffer, and said second interface unit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Preferred embodiments of the present invention will be described in detail with reference to the attached drawings. A detailed description of a known operation of the present invention will be omitted where it is deemed to obscure the subject matter of the present invention.

Figure 1:
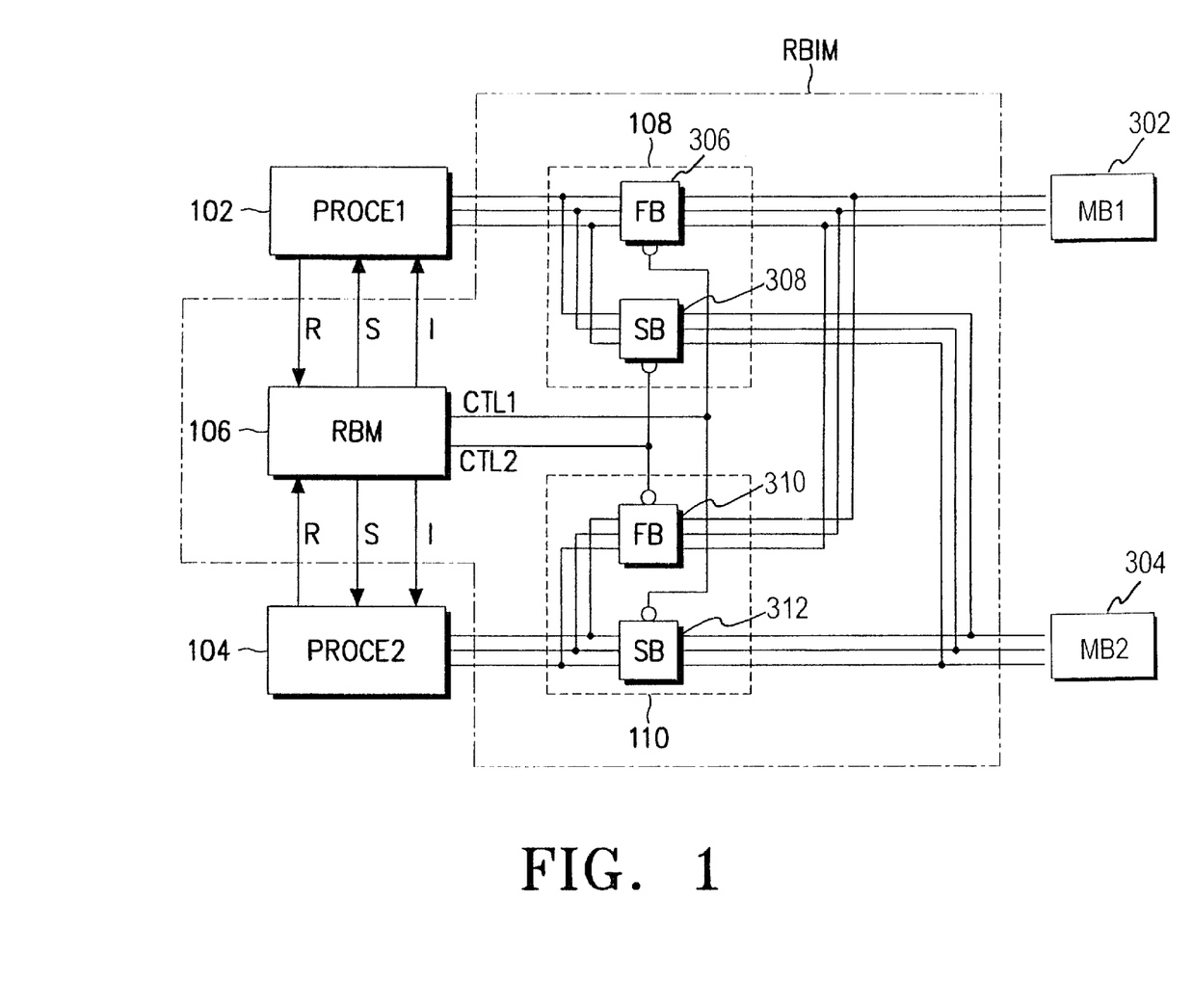
FIG. 1 is a block diagram of an interprocessor communication device transferring messages between adjacent processors through a rotation bus interface module (RBIM), in accordance with the principles of the present invention.

Turn now to FIG. 1, which is a block diagram of an interprocessor communication device transferring messages between adjacent processors through a rotation bus interface module (RBIM), in accordance with the principles of the present invention. FIG. 1 is a block diagram of an interprocessor communication device in which a message is transferred between adjacent processors through a rotation bus interface module (RBIM) according to an embodiment of the present invention.

Referring to FIG. 1, a rotation bus master (RBM) 106 is connected between two adjacent processors 102 and 104 (PROCE1 102 and PROCE2 104), for generating first and second control signals CTL1 and CTL2 to switch rotation buses connected to memory blocks MB1 302 and MB2 304 through handshaking between the PROCE1 102 and PROCE2 104. The buses are used for an address signal, a data signal, and a control signal, in the order from above.

Each of the memory blocks MB1 302 and MB2 304 has a register file rapidly accessible to the PROCE1 102 and PROCE2 104. While an embodiment of the present invention sets forth the memory blocks Mb1 302 and MB2 304 as a structure of a register file, it should be understood that a dynamic random access memory (DRAM) can be used as an example of a common memory structure. The first and second control signals CTL1 and CTL2 generated from the rotation bus master (RBM) 106 are fed to control ports of first and second buffer units 108 and 110. The first buffer unit 108 includes a first buffer FB 306 and second buffer SB 308. Buffer FB 306 and buffer SB 308 have input ports connected commonly to the PROCE1 102 and output ports separately connected to the first and second memory blocks Mb1 302 and MB2 304.

In FIG. 1, the second buffer unit 110 includes a first buffer FB 310 and a second buffer SB 312. Buffer FB 310 and buffer SB 312 have input ports connected commonly to the PROCE2 104 and output ports separately connected to the first and second memory blocks MB1 302 and MB2 304.

The rotation bus master (RBM) 106 of FIG. 1 is connected to each processor via three signal lines for a ready signal R, an initialization signal I, and a start signal S, for handshaking between the PROCE1 102 and PROCE2 104 to perform an interprocessor data transfer. The output states of the first and second control signals CTL1 and CTL2 for switching the rotation buses vary with the logic states of the ready signals R output from the PROCE1 102 and PROCE2 104. Here, the output logic of the first and second control signals CTL1 and CTL2 are mutually exclusive, which implies that if the first control signal CTL1 is at logic 0, for example, the second control signal CTL2 is at logic 1.

In the interprocessor communication device of FIG. 1, buses are switched to the PROCE1 102 or PROCE2 104 by handshaking between the PROCE1 102 and PROCE2 104 so that the PROCE1 102 and PROCE2 104 can selectively access the memory block Mb1 302 or MB2 304 by the unit time which is determined with the attributes of the system.

The interprocessor communication device of FIG. 1, in accordance with the principles of the present invention, has the following three advantages, in addition to other advantages. The first advantage is as follows. Because an input/output port of a processor can be isolated from a memory block for storing a transmit/receive message, the processor can have time required to perform a different function. That is, the processor need not assign time for receiving a message from another processor, thereby obviating the need for time division access to buses. The second advantage is as follows. A data transfer rate, a transmission mode, and the format of a data message exchanged between processors are easily determined depending on the properties of a corresponding processor, for example, an operating system program. The third advantage is as follows. Each processor can operate independently by transferring a message through a rotation bus interface module (RBIM) and thus data is processed in parallel in the system, resulting in increased system performance.

The rotation bus interface module (RBIM) using the rotation bus master (RBM) 106 is operated in a synchronous or asynchronous mode depending on the input states of the handshake signals R, I, and S. The R signal is a ready signal, the I signal is an initialization signal, and the S signal is a start signal. In the asynchronous mode, various methods can be applied, for example, transferring data in a time period or on the basis of a transaction between two processors.

Figure 2:
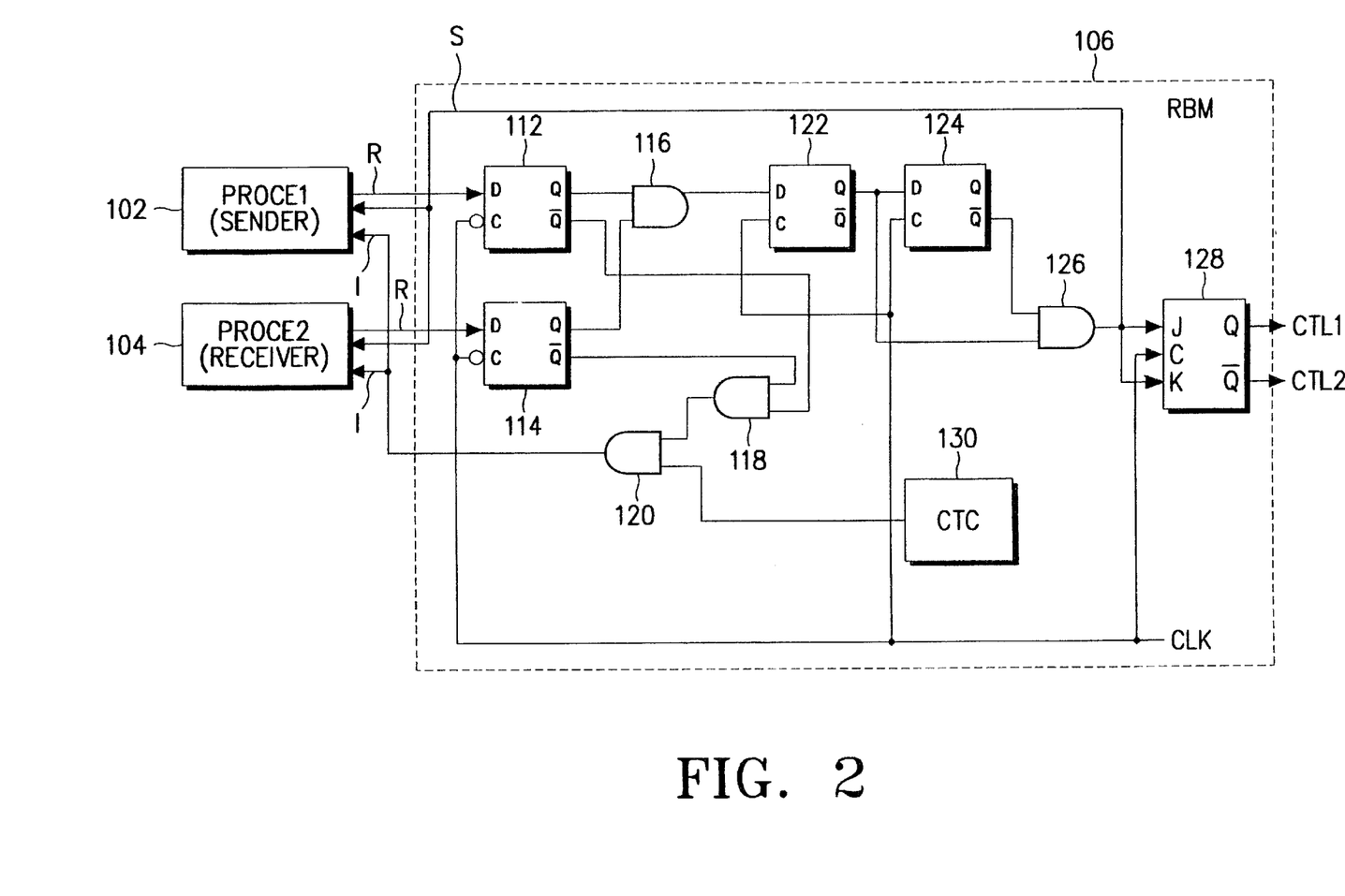
FIG. 2 is a detailed block diagram of a rotation bus master (RBM) shown in FIG. 1, in accordance with the principles of the present invention.

Turn now to FIG. 2, which is a detailed block diagram of a rotation bus master (RBM) 106 shown in FIG. 1, in accordance with the principles of the present invention. The input and output ports of the PROCE1 102 and PROCE2 104 are connected to the rotation bus master (RBM) 106 of FIG. 2 to allow handshaking representative of an information transfer state between the PROCE1 102 and PROCE2 104 through the rotation bus master (RBM) 106. The handshake signals include a ready signal R, an initialization signal I, and a start signal S. The ready signal R is output from the PROCE1 102 and PROCE2 104, while the initialization and start signals I and S are output from the rotation bus master (RBM) 106. The rotation bus master (RBM) 106 uses two clock signals: a system clock signal CLK provided to the system and an instruction clock signal being a cycle signal for use in transferring a message as a byte stream. The ready signal R is clocked at a rising edge of the system clock signal CLK, and the initialization and start signals I and S are transited at a falling edge of the system clock signal CLK. The rotation bus master (RBM) 106 serves to switch buses connected to the memory blocks MB1 302 and MB2 304 by the handshake signals output from the PROCE1 102 and PROCE2 104.

First flip-flop 112 in rotation bus master (RBM) 106 has a first input terminal D, a second input terminal C, a first output terminal Q, and a second output terminal $\overline{Q}$. The first output terminal Q outputs signal Q while the second output terminal $\overline{Q}$ outputs inverted signal $\overline{Q}$. Shown below is a description of the operation of the rotation bus master (RBM) 106 shown in FIG. 2. Upon completion of predetermined normal operations of the PROCE1 102 and PROCE2 104, they output their ready signals R at logic 0. Then, first and second flip-flops 112 and 114 having input terminals connected to the output terminals of the PROCE1 102 and PROCE2 104 transit output signals at inverted output terminals $\overline{Q}$ to logic high by clocking the ready signals R by the system clock signal CLK, respectively.

A logical AND gate 116, having two input terminals connected to the two output terminals Q of the first and second flip-flops 112 and 114, performs a logical AND operation on logic low latched signals and feeds the output to an input terminal D of a third flip-flop 122. A logical AND gate 118, having input terminals connected to the inverted output terminals $\overline{Q}$ of the first and second flip-flops 112 and 114, outputs a logic high signal to an input terminal of a logical AND gate 120. The AND gate 120 AND-gates the output of the AND gate 118 and a message transmission clock signal generated from a message transmission clock generator CTC 130. In other words, the logical AND gate 120 performs a logical AND operation upon the output of the logical AND gate 118 and a message transmission clock signal generated from a message transmission clock generator CTC 130. Then logical AND gate 120 outputs a low-to-high transited initialization signal I to the PROCE1 102 and PROCE2 104. By the activated initialization signal I, the PROCE1 102 and PROCE2 104 notifies the other processors of the completion of their normal operations.

If each of the PROCE1 102 and PROCE2 104 receives the initialization signal I at logic 1 and has messages to transfer to the other processor, the processor outputs the ready signal R at logic 1 to switch data access paths of the memory blocks MB1 302 and MB2 304. Then, the inverted outputs $\overline{Q}$ of the first and second flip-flops 112 and 114 are transited to logic 0, and thus the initialization signal I is transited to logic 0. The logical AND gate 116 feeds a signal at logic 1 to the input terminal D of the third flip-flop 122. The third flip-flop 122 latches the logic high signal at a rising edge of the system clock signal CLK and outputs the latched signal to an input terminal D of a fourth flip-flop 124.

A logical AND gate 126 activates the start signal S to logic 1 by AND-gating the output from the output terminal Q of the third flip-flop 122 and the previous inverted signal output from the inverted output terminal $\overline{Q}$ of the fourth flip-flop 124. This activated start signal S is simultaneously fed to an input terminals J and K of a toggle flip-flop 128 and also fed to the PROCE1 102 and PROCE2 104 to notify the PROCE1 102 and PROCE2 104 that the input ports of the memory blocks Mb1 302 and MB2 304 are switched. Then, the PROCE1 102 and PROCE2 104 transmit messages to the memory blocks MB1 302 and MB2 304 or retrieve message data from the memory blocks Mb1 302 and MB2, for the next operation of predetermined functions.

Relying on the principle illustratively described referring to FIG. 2, the rotation bus interface module (RBIM) operates in a synchronous or asynchronous transmission mode according to the properties, processing speeds, and data transferring method of adjacent processors for performing their predetermined functions, that is, the PROCE1 102 and the PROCE2 104.

The asynchronous transmission mode is characterized by independent information transmission and reception and divided into two methods. That is, when a message of a predetermined size is asynchronously received, data transfer is performed in a preset time period, and when an information message to be transferred is generated randomly, the data transfer is based on a transaction. The synchronous/asynchronous transmission mode is selectively determined according to a handshaking program for the PROCE1 102 and the PROCE2 104 shown in FIG. 2, as will be described in detail later.

As shown above, it is to be noted that the message transmission clock signal is used in the synchronous transmission mode only, and fixed to high state 1 to enable the logical AND gate 120 in the asynchronous transmission mode.

Figure 3:
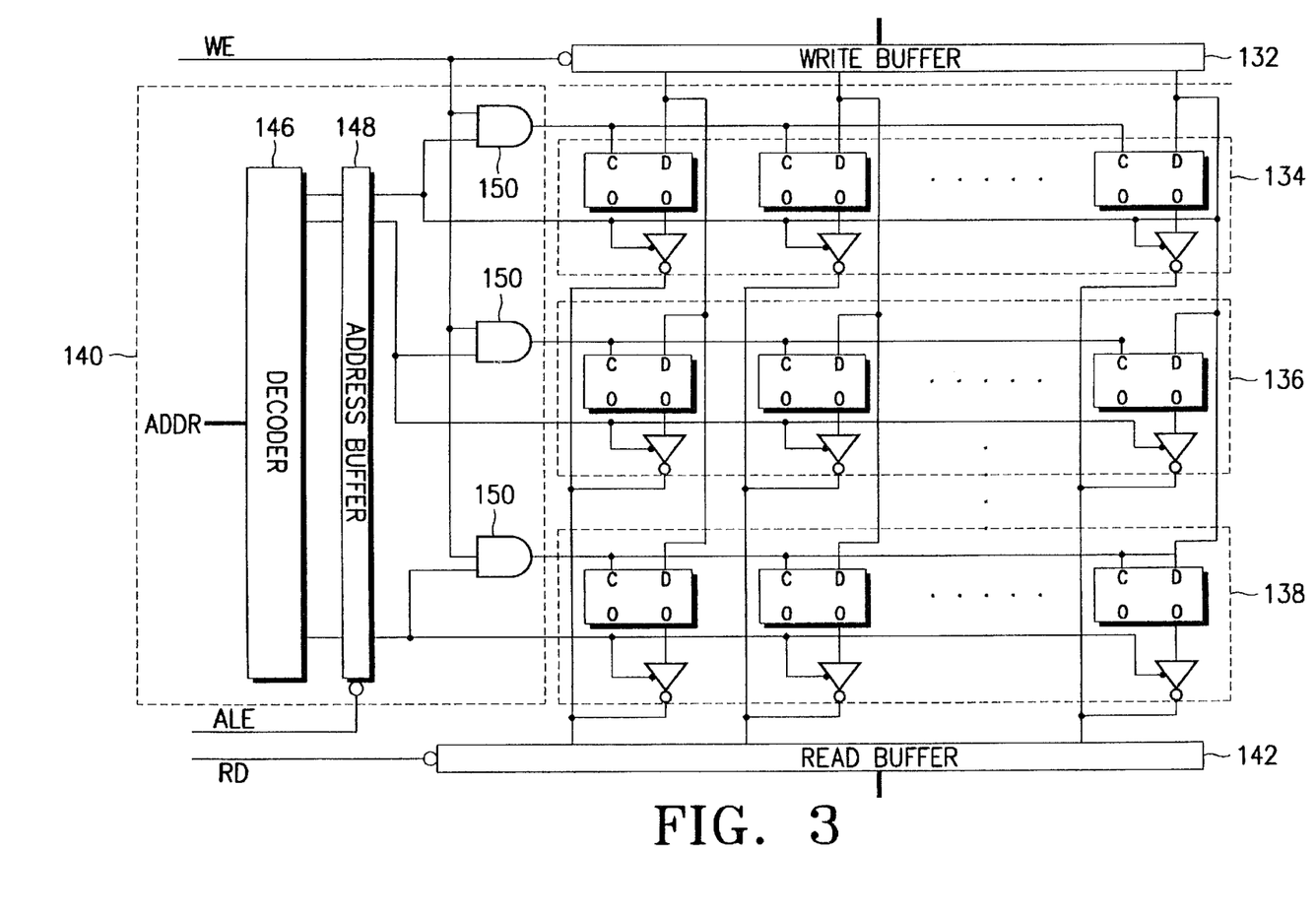
FIG. 3 is a block diagram of a rapidly accessible register file in a memory block shown in FIG. 1, in accordance with the principles of the present invention.

Turn now to FIG. 3, which is a block diagram of a rapidly accessible register file in a memory block shown in FIG. 1, in accordance with the principles of the present invention. In other words, FIG. 3 is a block diagram of the memory block MB1 302 or MB2 304 connected to the rotation buses of FIG. 1 according to the embodiment of the present invention. In the memory block, a recording buffer 132 is enabled by a write control signal WE and buffers input data. The recording buffer 132 is also known as a write buffer 132. A plurality of row registers 134, 136, and 138 include a plurality of flip-flops latching the bits of the buffered data in response to a write clock signal, and a plurality of tri-state buffers outputting signals latched by a row selection signal. A decoder 140 activates one of the row lines by decoding an externally input address, and generates a write clock signal to the flip-flops located on the activated row line. A read buffer 142 outputs data received from the row registers 134, 136, and 138 by a read control signal RD.

The decoder 140 has an address decoder 146 for predecoding an address and selecting one of the row lines, an address buffer 148 for buffering the output of the address decoder 146, and a plurality of logical AND gates 150 for AND-gating a row line selection signal received from the address buffer 148 and the write control signal WE and generating a write clock signal. Each of the row registers 134, 136, and 138 include a plurality of D flip-flops latching data bits received via delay terminals D by the write clock signal received from the logical AND gates 150, and a plurality of tri-state buffers connected to output terminals Q of the D flip-flops, for transmitting the signals latched in the flip-flops to the read buffer 142.

Upon input of an address via the rotation bus interface module (RBIM), the address decoder 146 decodes the address. Then, the address buffer 148 buffers the decoded signal received from the address decoder 146 and activates one of the row lines. In this state, when the write buffer 132 receives data and an activated write control signal WE and the logical AND gates 150 receive the write control signal WE, only the logical AND gate 150 connected to the activated row line feeds an activated write clock signal to the clock terminals C of corresponding flip-flops. The flip-flops latch data received at the data terminals D from the write buffer 132 and output the latched data to the read buffer 142 via tri-state buffers enabled by an activated row line signal. The read buffer 142 outputs the signal received from the tri-state buffers upon input of an activated read control signal RD through a rotation bus.

Figure 4:
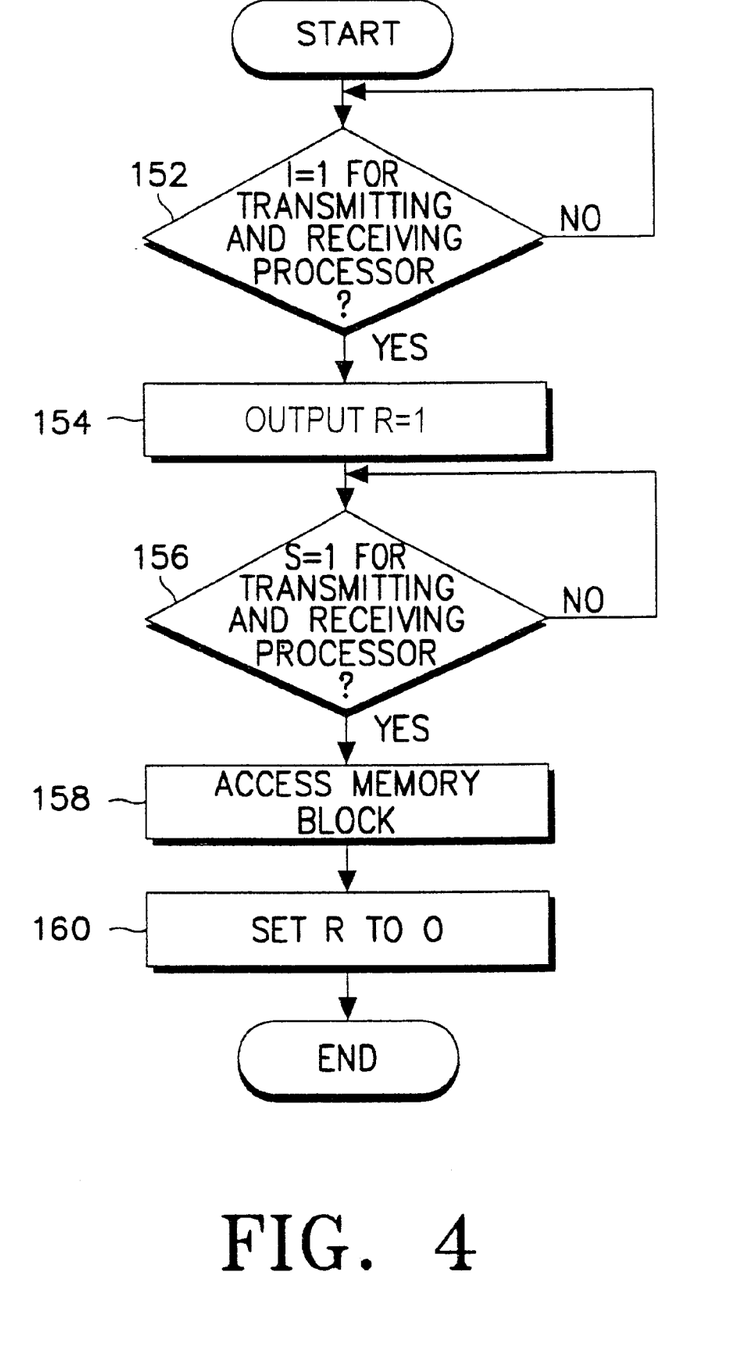
FIG. 4 is a flowchart of an operation of processors performing a synchronous message transmission through the rotation bus interface module (RBIM) shown in FIG. 1, in accordance with the principles of the present invention.

Turn now to FIG. 4, which is a flowchart of an operation of processors performing a synchronous message transmission through the rotation bus interface module (RBIM) shown in FIG. 1, in accordance with the principles of the present invention. In other words, FIG. 4 is a flowchart of operating the PROCE1 102 and the PROCE2 104 for a synchronous message transmission using the rotation bus interface module (RBIM) shown in FIG. 2.

In FIG. 4, at step 152, the PROCE1 102 and the PROCE2 104 determine whether their initialization signals I are set to high state 1 and the rotation bus master (RBM) 106 is initialized. High state 1 corresponds to logic 1. At step 154, when the initialization signals I are determined to be high state 1, the PROCE1 102 and the PROCE2 104 output ready signals R at high state 1. At step 156, the PROCE1 102 and the PROCE2 104 determine whether they receive start signals S at high state 1. Here, the rotation bus master (RBM) 106 of FIG. 2 transits the start signal S to logic 1. At step 158, when the start signals S are high state 1, the PROCE1 102 and the PROCE2 104 access memory blocks MBi, where i corresponds to an integer. Memory block MB is switched when the two processors output logic 1 and the start signal S transits to a high state 1. In this manner, the PROCE1 102 and the PROCE2 104 are connected to different memory blocks MBi through the buses, virtually switching the buses connected to the memory blocks Mbi. Then, at step 160, the PROCE1 102 and the PROCE2 104 transit the ready signals R to low state 0.

Figure 5:
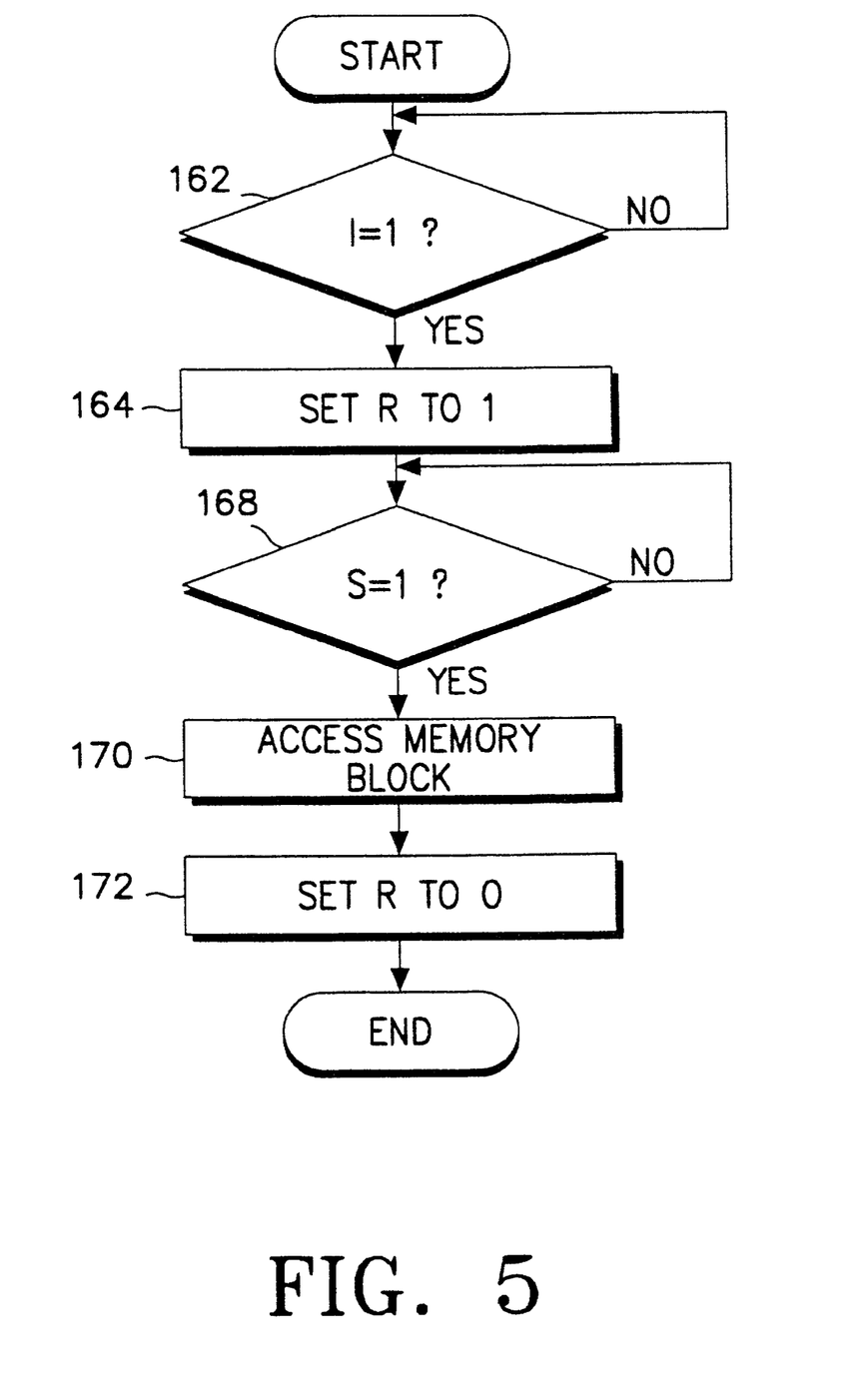
FIG. 5 is a flowchart of an operation of the processors performing an asynchronous message transmission through the rotation bus interface module (RBIM) shown in FIG. 1, in accordance with the principles of the present invention.

Turn now to FIG. 5, which is a flowchart of an operation of the processors performing an asynchronous message transmission through the rotation bus interface module (RBIM) shown in FIG. 1, in accordance with the principles of the present invention. In other words, FIG. 5 is a flowchart of operating a processor asynchronously transmitting a message in a time period through the rotation bus interface module (RBIM) of FIG. 2.

In FIG. 5, at step 162, the processor PROCE1 102 or the processor PROCE2 104 determine whether an initialization signal I is at logic 1 indicating that a receiving processor read a message. At step 164, when the initialization signal I is at logic 1, the processor outputs a ready signal R at logic 1. At step 168, the processor determines whether a start signal S is at logic 1. At step 170, upon input of the start signal at logic 1, the processor outputs a transmission message. At step 172, the processor sets the ready signal R to logic 0. Thus, the PROCE1 102 or the PROCE2 104 accesses a memory block MBi through the rotation bus master (RBM) 106 with the ready signal R activated to logic 1 and stores a message of a predetermined size or reads a message in or from the memory block, in the asynchronous transmission mode of FIG. 5.

The two processors process their job simultaneously. If the job of the two processors is completed, then each processor produces a ready signal R at logic 0 and thereby transits the initialization signal I to logic 1. When the initialization signal I is at logic 1, both processors have completed their job and so, each produces the ready signal R at logic 0. Additionally, processors receiving the initialization signal I at logic 1 output the ready signal R at logic 1, and switch the memory blocks MBi, and then process the next operation.

Figure 6:
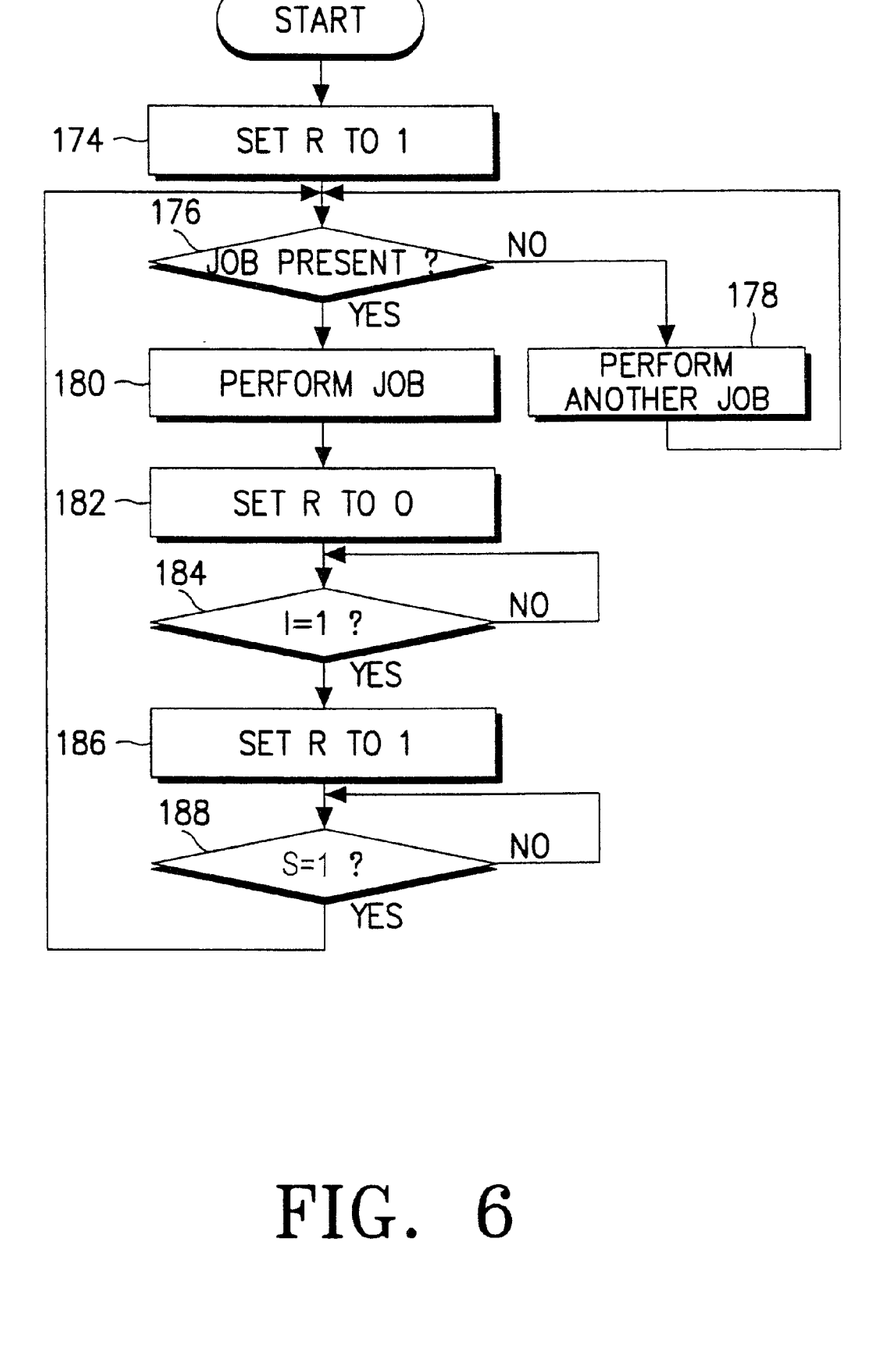
FIG. 6 is a flowchart of a process of operating a transmitting processor for a transactional asynchronous message transmission through the rotation bus interface module (RBIM) shown in FIG. 1, in accordance with the principles of the present invention.
Figure 7:
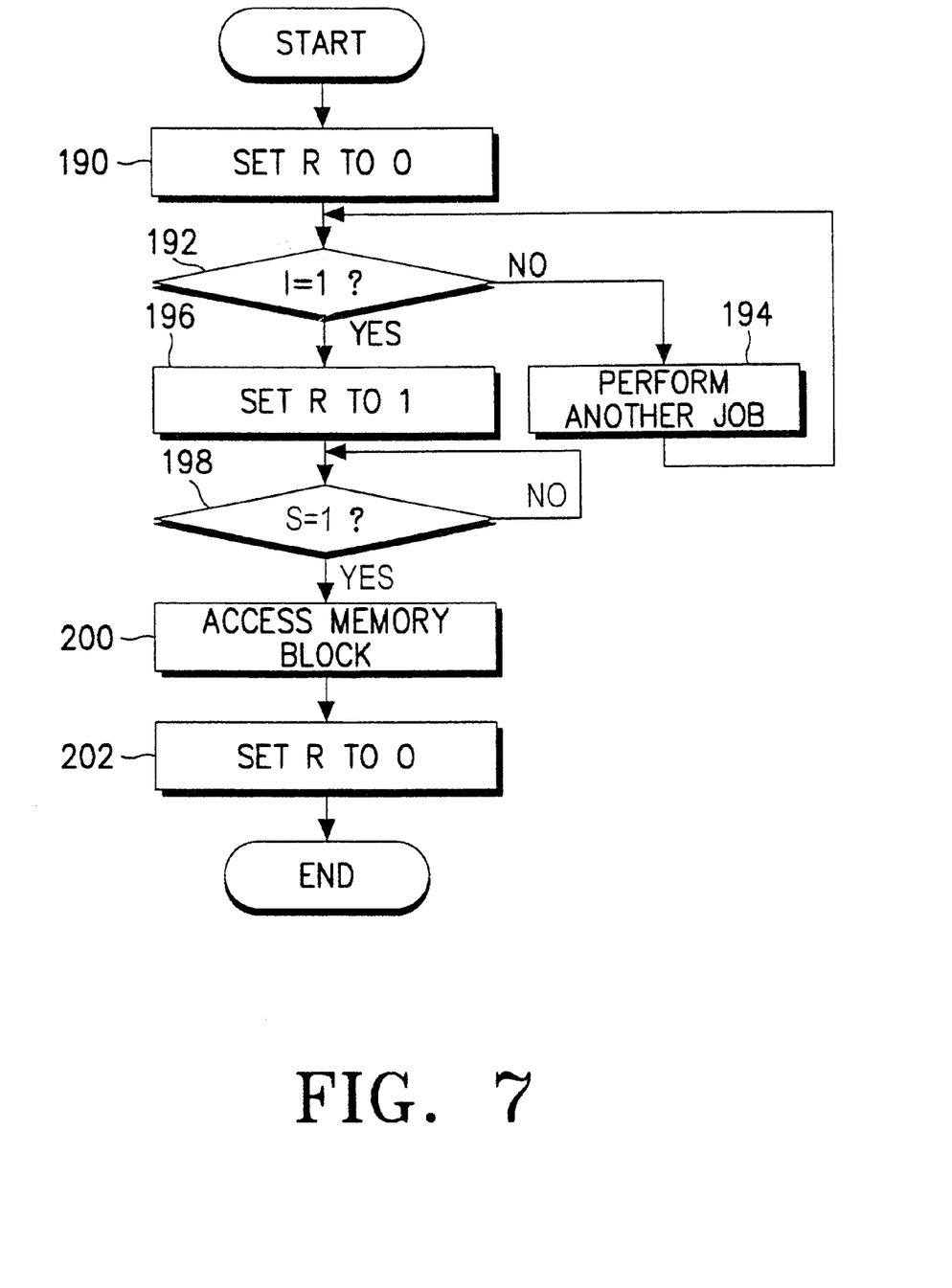
FIG. 7 is a flowchart of a process of operating a receiving processor for a transactional asynchronous message transmission through the rotation bus interface module (RBIM) shown in FIG. 1, in accordance with the principles of the present invention.

FIGS. 6 and 7 are flowcharts of operating processors for an asynchronous message transmission by a transaction through the rotation bus interface module (RBIM) shown in FIG. 2. Turn now to FIG. 6, which is a flowchart of a process of operating a transmitting processor for a transactional asynchronous message transmission through the rotation bus interface module (RBIM) shown in FIG. 1, in accordance with the principles of the present invention.

In FIG. 6, at step 174, the processor PROCE1 102, being a transmitting processor here, is initialized and then sets a ready signal R to logic 1. At step 176, the processor PROCE1 102 determines whether there exists a job of transmitting a message to the other processor. At step 178, when there exists no job of transmitting a message to the other processor, the processor PROCE1 102 performs a different job. At step 180, when there exists a job of transmitting a message to the other processor, the processor PROCE1 102 accesses a corresponding memory block and writes the message in the memory block. At step 182, upon completion of the message writing, the processor PROCE1 102 outputs the ready signal at logic 0 indicative of the completed message writing. At step 184, the processor PROCE1 102 determines whether the initialization signal I is received at logic 1.

In FIG. 6, at step 186, when the rotation bus master (RBM) 106 outputs the initialization signal I at logic 1, the PROCE1 102 outputs the ready signal R at logic 1 to switch a memory block to be accessed. Here, it is to be noted that the initialization signal I is generated only if ready signals R are output at logic 0 from the PROCE1 102 and the PROCE2 104 after their normal operations.

In FIG. 6, at step 188, the processor PROCE1 102 determines whether the start signal S is transited to logic 1. When the processor PROCE1 102 determines, in step 188, that the start signal S is at logic 1, step 176 is performed next. The step 176 is performed next because it has been determined that the memory block MBi is switched.

Turn now to FIG. 7, which is a flowchart of a process of operating a receiving processor for a transactional asynchronous message transmission through the rotation bus interface module (RBIM) shown in FIG. 1, in accordance with the principles of the present invention. In FIG. 7, at step 190, the processor PROCE2 104, being a receiving processor here, outputs a ready signal R at logic 0 by initialization. At step 192, the processor PROCE2 104 determines whether an initialization signal I is received at logic 1 from the rotation bus master (RBM) 106. The reason for outputting the initial ready signal R at logic 0 is to cause the rotation bus master (RBM) 106 to output the initialization signal I at logic 1.

In FIG. 7, at step 194, when the initialization signal I is not at logic 1, the processor PROCE2 104 performs a different job. At step 196, when the initialization signal I is at logic 1, when the processor PROCE1 102 outputs the ready signal R at logic 0 after its normal operation, the processor PROCE2 104 outputs the ready signal R at logic 1 to access a memory block. At step 198, the processor PROCE2 104 determines whether the start signal S is received at logic 1 from the rotation bus master (RBM) 106.

When the processor PROCE1 102 outputs the ready signal R at logic 1 to access a memory block after its normal operation, the rotation bus master (RBM) 106 transits the start signal S to logic 1. Thus, at step 200, the processor PROCE2 104 accesses the memory block and reads a message from the memory block. At step 202, upon completion of the message reading, the processor PROCE2 104 outputs the ready signal R at logic 0, so that when the processor PROCE1 102 accesses a message stored in a memory block and then outputs the ready signal R at logic 0, the initialization signal I can be fed at logic 1 to the processor PROCE1 102 and the processor PROCE2 104.

Therefore, in the asynchronous message transmission by a transaction shown in FIGS. 6 and 7, a randomly generated information message is asynchronously transferred by handshaking between the PROCE1 102 and the PROCE2 104 through the rotation bus master (RBM) 106.

Figure 8:
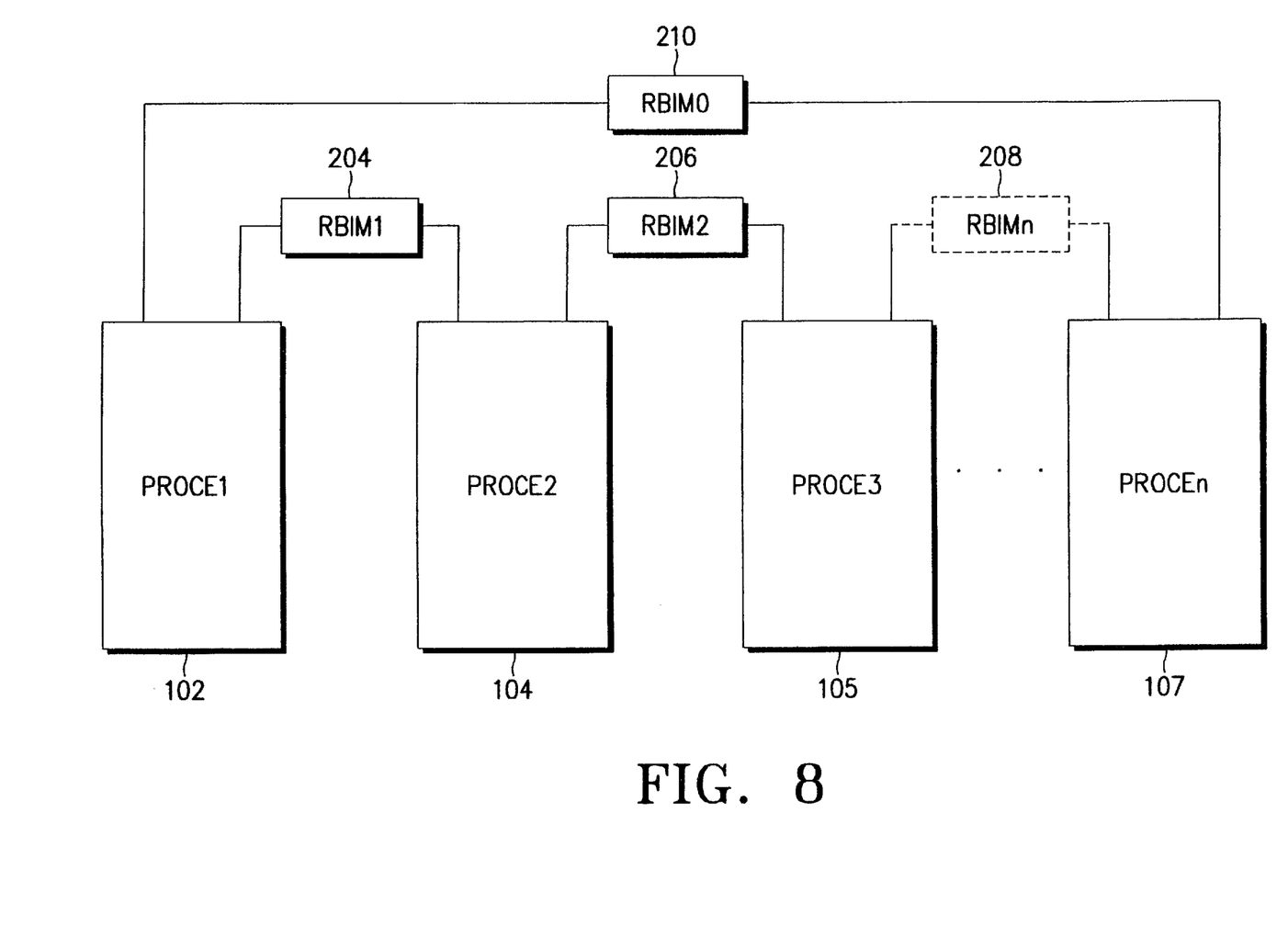
FIG. 8 is a block diagram of a multi-processor system to which a interprocessor communication device is applied, in accordance with the principles of the present invention.

Turn now to FIG. 8, which is a block diagram of a multi-processor system to which a interprocessor communication device is applied, in accordance with the principles of the present invention. Note that the symbol n corresponds to a first integer and the symbol i corresponds to a second integer. In FIG. 8, a plurality of rotation bus interface modules RBIM1 204, RBIM2 206, and RBIMn 208 are connected among a plurality of processors PROCE1 102, PROCE2 104, PROCE3 105, and PROCEn 107, in order to mutually transfer messages.

In FIG. 8, each of the rotation bus interface modules (RBIMs) includes at least two memory blocks MBi shown in FIG. 3. For example, the processor PROCE1 102 transmits/receives a message to/from the processor PROCEn 107 or the processor PROCE2 104 by handshaking through the rotation bus interface module RBIM0 210 between the processor PROCE1 102 and the processor PROCEn 107 or by handshaking through the rotation bus interface module RBIM1 204 between the processor PROCE1 102 and the processor PROCE2 104.

A message transfer between the processor PROCE1 102 and the processor PROCE3 105 is performed by the relay of the processor PROCE2 104 interposed between the processor PROCE1 102 and the processor PROCE3 105. A message relay is a procedure in which, when a destination code stored in an address field of a message format from an adjacent processor is different from a unique code of the receiving processor, the message is transferred to a processor corresponding to the destination code. In this manner, a processor can transfer a message to a remote processor through an adjacent processor.

Figure 9:
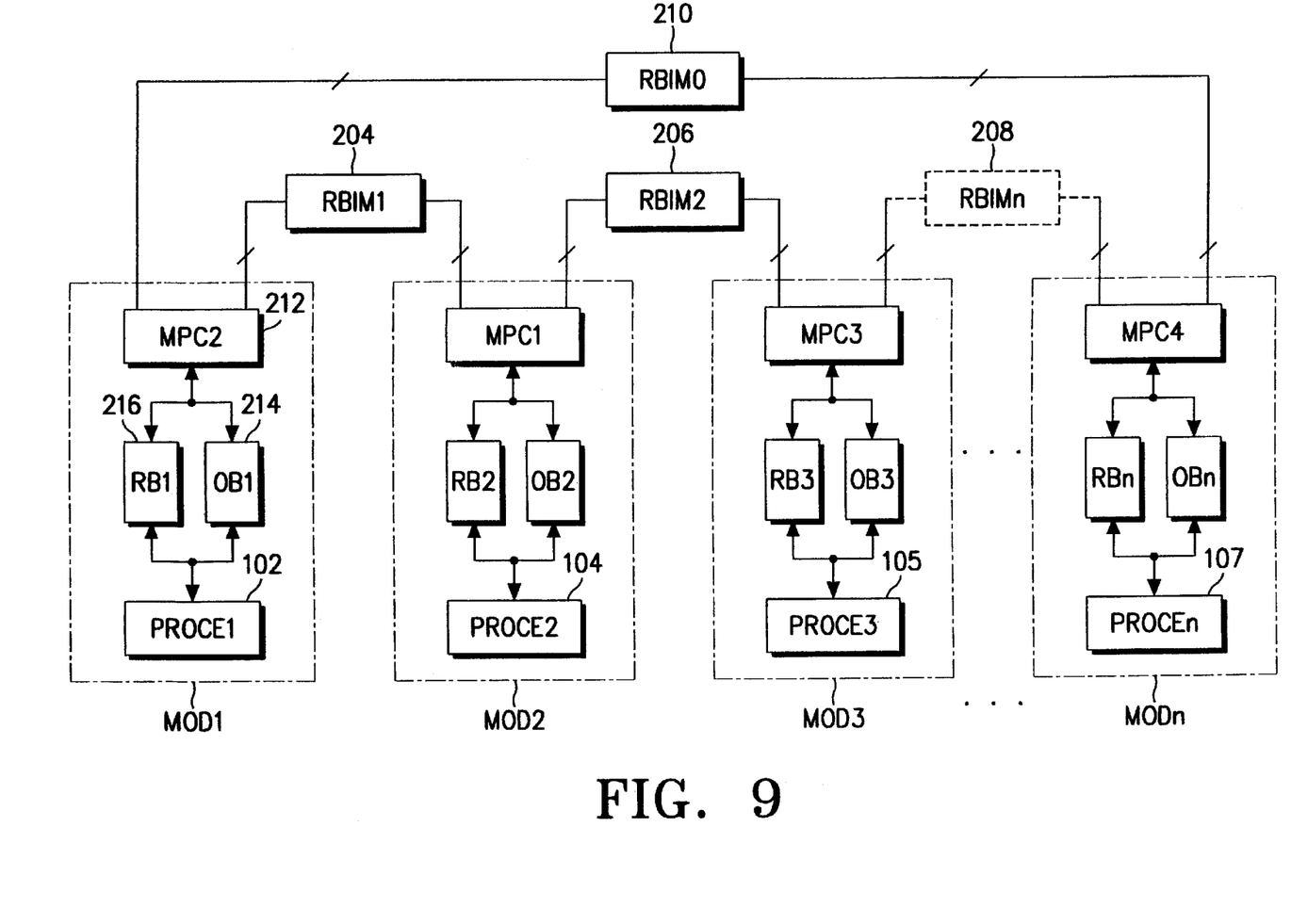
FIG. 9 is a block diagram of another embodiment of an interprocessor communication device transferring a message between processors over a message passing network, in accordance with the principles of the present invention.

Turn now to FIG. 9, which is a block diagram of another embodiment of an interprocessor communication device transferring a message between processors over a message passing network, in accordance with the principles of the present invention. FIG. 9 is a block diagram of an interprocessor communication device for mutually transferring a message between processor modules MODi, where i is an integer, over a message passing network according to another embodiment of the present invention.

Referring to FIG. 9, a message passing controller MPCi for controlling input and output of a message through rotation buses is connected between an RBIMh and an RBIMJ. Here, h, i, j are integers and h<i<j. For example, presume that message passing controller MPC2 212 corresponds to MPCi and that processor module MOD1 corresponds to MODi. The message passing controller MPCi only exchanges messages in a processor module MOD1. A message is transferred from h to j via i in this single direction over a message passing network. Between the RBIMh and a processor PROCEi, there is an ith reporting buffer (RBi) for transferring a message from the processor PROCEi to the RBIMj upon input of an empty message from the RBIMh, and an ith operation buffer (OBi) for transferring a message received from the RBIMh to the processor PROCEi when the destination identification ID is the identification ID of the processor PROCEi.

Over the thus-constituted message passing network passes a message, for example, the processor PROCE1 102 passes a message received from an adjacent processor, the processor PROCEn 107 or the processor PROCE2 104, or processes a message headed for the processor PROCEi by the reporting buffer Rb1 216, under the control of the message passing controller MPC1 212. Here, a processor module MODi passes a message received from a processor module MODh to an adjacent processor module MODj if a destination code included in an address field of a received data frame is different from a message passing controller MPCi code.

In the interprocessor communication device having a message passing function according to the embodiment of the present invention shown in FIG. 9 as described above, the processor PROCEi in the processor module MODi can transfer a message received from the processor module MODh to the processor module MODj by accessing data stored in the reporting buffer RBi in a predetermined time period or writing data in the operation buffer OBi under the control of the message passing controller MPCi. Therefore, a rapid interprocessor message transfer can be achieved without increasing software load on the processor PROCEi, and thus the processor module MODi can transfer a message, while performing a normal operation. This facilitates realization of a large capacity switching system, for example, an asynchronous transfer mode (ATM) switching network used in broadband-integrated service digital network (B-ISDN)because call processing and message transfer for repair and maintenance can be separately performed.

Figure 10:
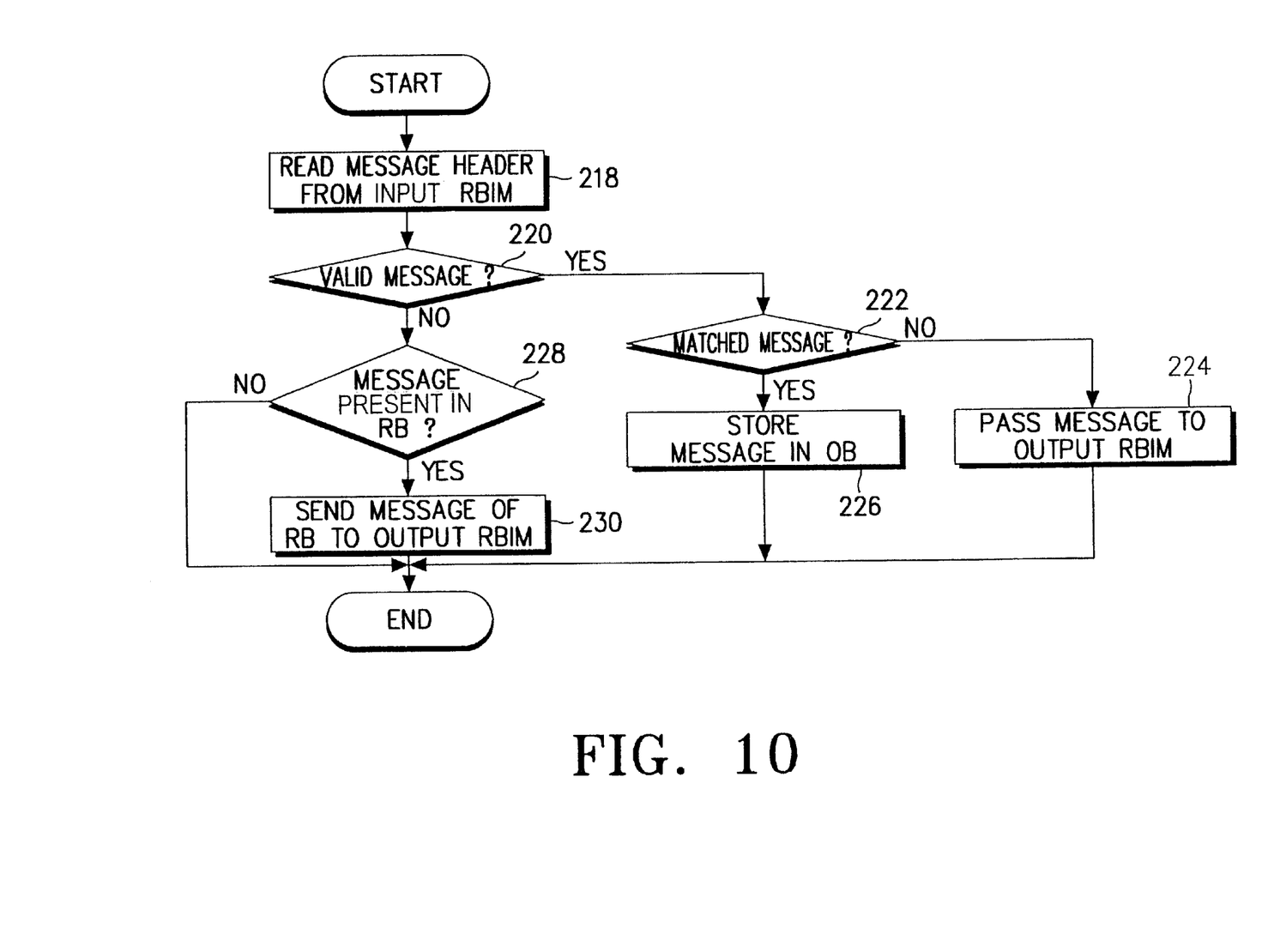
FIG. 10 is a flowchart of a control operation of a message passing controller in the message passing network shown in FIG. 9, in accordance with the principles of the present invention.

Turn now to FIG. 10, which is a flowchart of a control operation of a message passing controller in the message passing network shown in FIG. 9, in accordance with the principles of the present invention. Referring to FIG. 10, the operation of the interprocessor communication using the message passing network of FIG. 9 will be described as follows.

In FIG. 10, at step 218, when the message passing network of FIG. 9 is operative, the message passing controller MPC1 212, for example, reads the header of a message received from the rotation bus interface module RBIM0 210. At step 220, the message passing controller MPC1 212 determines whether the message is valid. A valid message is a non-empty message which has a specific destination. At step 222, when the received message is determined to be valid, the message passing controller MPC1 212 determines whether the message matches with the processor PROCE1 102.

In FIG. 10, at step 226, when the message matches with the processor PROCE1 102, the message passing controller MPC1 212 stores the message in the operation buffer Ob1 214. By this operation, the processor PROCE1 102 for controlling the processor module MOD1 processes the message stored in the operation buffer OB1 214. In this manner, the processor PROCE1 102 receives a message from the processor module MODn. At step 224, when the message received from the rotation bus interface module RBIM0 210 does not match with the processor PROCE1 102, the message passing controller MPC1 212 passes the message to the rotation bus interface module RBIM1 204.

In FIG. 10, at step 228, when there is no message received from the rotation bus interface module RBIM0 210 or when a received message is not valid, the message passing controller MPC1 212 determines whether a message is stored in the reporting buffer RB1 216. In the absence of a message in the reporting buffer RB1 216, the message passing controller MPC1 212 ends the passing control operation. At step 230, in the presence of the message in the reporting buffer RB1 216, the message passing controller MPC1 212 reads the message from the reporting buffer RB1 216 and transmits the read message to the rotation bus interface module RBIM1 204.

Therefore, the message passing network constituted as shown in FIG. 9 and operated according to the control algorithm of FIG. 10 sends a message from the processor module MODi to the processor module MODj or passes a message from a different processor module.

In the present invention as described above, a message is transferred at high speed between processors using a rotation bus interface module (RBIM), and interprocessor data transfer has little influence on system performance by involving a message passing network configured into a ring in message transmission/reception.

While interprocessor message transmission/reception is performed by switching buses connected to memory block through handshaking between processors in the above embodiments, it is to be clearly understood that the buses can be switched by synchronously controlling the buffers connected between the processors and the memory blocks at an instruction cycle or a system processing cycle of the processors, to obtain the same effects.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus enabling communication between processors, comprising:

a plurality of processor units receiving and transmitting address signals, data signals, and control signals;

a plurality of interface units, each interface unit among said plurality of interface units conveying message data from a source processor unit selected from among said plurality of processor units to a destination processor unit selected from among said plurality of said processor units in accordance with intercommunication signals, said interface units receiving and transmitting said intercommunication signals from and to said plurality of processor units, said message data corresponding to said data signals, address signals, and control signals, said plurality of interface units including a first interface unit and a second interface unit;

a plurality of reporting buffers, each reporting buffer among said plurality of reporting buffers being connected to one processor unit among said plurality of processor units, temporarily storing message data to be output to one interface unit selected from among said plurality of interface units;

a plurality of operation buffers, each operation buffer among said plurality of operation buffers being connected to one processor unit among said plurality of processor units, temporarily storing message data received from one interface unit selected from among said plurality of interface units; and a plurality of message passing units, wherein a first message passing unit among said plurality of message passing units is connected to a first reporting buffer and a first operation buffer selected from among said plurality of reporting and operation buffers, said first message passing unit receiving first message data from said first interface unit, transmitting said first message data to one of said first reporting buffer, said first operation buffer, and said second interface unit.

2. The apparatus of claim 1, wherein said first message passing unit performs said transmitting of said first message data to one of said first reporting buffer, said first operation buffer, and said second interface unit in accordance with said intercommunication signals, data signals, address signals, and control signals.

3. The apparatus of claim 1, further comprising:
a plurality of processor buses coupled to said plurality of processor units; and
a plurality of memory buses coupled to said plurality of memory units.

4. The apparatus of claim 1, wherein said first message passing unit reads a header of second message data received from said first interface unit, transmits said second message data to one of said first operation buffer and said second interface unit when said second message data corresponds to a predetermined valid data, and transmits third message data from said first reporting buffer to said second interface unit when said second message data does not correspond to said predetermined valid data.

5. The apparatus of claim 1, wherein said intercommunication signals further comprise initialization signals and start signals transmitted from said first interface unit, and ready signals received by said first interface unit.

6. The apparatus of claim 5, wherein said receiving and transmitting of said intercommunication signals comprise the steps of:
said first interface unit transmitting said initialization signal to said source processor unit;
said first interface unit transmitting said start signal to said source processor unit; and
said first interface unit receiving said ready signal from said source processor unit.

7. The apparatus of claim 1, wherein said intercommunication signals correspond to handshake signals.

8. An apparatus enabling communication between processors, comprising:
a plurality of processor units receiving and transmitting address signals, data signals, and control signals;
a plurality of interface units, each interface unit among said plurality of interface units conveying message data from a source processor unit selected from among said plurality of processor units to a destination processor unit selected from among said plurality of said processor units in accordance with intercommunication signals, said interface units receiving and transmitting said intercommunication signals from and to said plurality of processor units, said message data corresponding to said data signals, address signals, and control signals, said plurality of interface units including a first interface unit and a second interface unit;
a plurality of reporting buffers, each reporting buffer among said plurality of reporting buffers being connected to one processor unit among said plurality of processor units, temporarily storing message data to be output to one interface unit selected from among said plurality of interface units;
a plurality of operation buffers, each operation buffer among said plurality of operation buffers being connected to one processor unit among said plurality of processor units, temporarily storing message data received from one interface unit selected from among said plurality of interface units; and
at least one message passing unit, said at least one message passing unit being connected to at least a first reporting buffer and a first operation buffer selected from among said plurality of reporting and operation buffers, said at least one message passing unit receiving first message data from said first interface unit, transmitting said first message data to one of said first reporting buffer, said first operation buffer, and said second interface unit.

9. An apparatus enabling communication between processors, comprising:
a plurality of processor units receiving and transmitting signals;
a plurality of interface units conveying message data from a source processor unit selected from among said plurality of processor units to a destination processor unit selected from among said plurality of said processor units in accordance with intercommunication signals, said interface units receiving and transmitting said intercommunication signals from and to said plurality of processor units, said plurality of interface units including a first interface unit and a second interface unit;
a plurality of reporting buffers. each reporting buffer among said plurality of reporting buffers being connected to one processor unit among said plurality of processor units, temporarily storing message data to be output to one interface unit selected from among said plurality of interface units;
a plurality of operation buffers, each operation buffer among said plurality of operation buffers being connected to one processor unit among said plurality of processor units, temporarily storing message data received from one interface unit selected from among said plurality of interface units; and
a plurality of message passing units, wherein a first message passing unit among said plurality of message passing units is connected to a first reporting buffer and a first operation buffer selected from among said plurality of reporting and operation buffers, said first message passing unit receiving first message data from said first interface unit, transmitting said first message data to one of said first reporting buffer, said first operation buffer, and said second interface unit.

10. The apparatus of claim 9, wherein said first message passing unit performs said transmitting of said first message data to one of said first reporting buffer, said first operation buffer, and said second interface unit in accordance with said intercommunication signals.

11. The apparatus of claim 9, wherein said first message passing unit performs said transmitting of said first message data to one of said first reporting buffer, said first operation buffer, and said second interface unit in accordance with said signals transmitted by at least one of said plurality of processor units.

12. The apparatus of claim 11, wherein said first message passing unit reads a header of second message data received from said first interface unit, transmits said second message data to one of said first operation buffer and said second interface unit when said second message data corresponds to a predetermined valid data, and transmits third message data from said first reporting buffer to said second interface unit when said second message data does not correspond to said predetermined valid data.

13. The apparatus of claim 12, further comprising:
a plurality of processor buses coupled to said plurality of processor units; and
a plurality of memory buses coupled to said plurality of buffers.

14. The apparatus of claim 13, wherein said intercommunication signals further comprise initialization signals and start signals transmitted from said first interface unit, and ready signals received by said first interface unit.

15. The apparatus of claim 8, further comprising:
a plurality of processor buses coupled to said plurality of processor units; and a plurality of memory buses coupled to said plurality of buffers.

16. The apparatus of claim 15, wherein said intercommunication signals further comprise initialization signals and start signals transmitted from said first interface unit, and ready signals received by said first interface unit.

17. The apparatus of claim 16, wherein said receiving and transmitting of said intercommunication signals comprise the steps of:

said first interface unit transmitting said initialization signal to said source processor unit;

said first interface unit transmitting said start signal to said source processor unit; and said first interface unit receiving said ready signal from said source processor unit.

18. The apparatus of claim 17, wherein said intercommunication signals correspond to handshake signals.

19. The apparatus of claim 8, wherein said intercommunication signals further comprise initialization signals and start signals transmitted from said first interface unit, and ready signals received by said first interface unit.

20. The apparatus of claim 19, wherein said receiving and transmitting of said intercommunication signals comprise the steps of:

said first interface unit transmitting said initialization signal to said source processor unit;

said first interface unit transmitting said start signal to said source processor unit; and said first interface unit receiving said ready signal from said source processor unit.

21. A method of communicating between processors, comprising:

receiving and transmitting address signals, data signals, and control signals, said receiving and transmitting being performed by a plurality of processor units, said plurality of processor units including a source processor unit and a destination processor unit;

conveying message data from said source processor unit to said destination processor unit in accordance with intercommunication signals, said conveying being performed by a first interface unit selected from among a plurality of interface units including at least said first interface unit and a second interface unit, said first interface unit receiving and transmitting said intercommunication signals from and to said plurality of processor units, said message data corresponding to said address signals, data signals, and control signals;

temporarily storing first message data in at least one reporting buffer selected from among a plurality of reporting buffers, said first message data to be output to an interface unit selected from among said plurality of interface units, each one reporting buffer being connected to at least one processor unit selected from among said plurality of processor units;

temporarily storing second message data in at least one operation buffer selected from among a plurality of operation buffers, said second message data being received from an interface unit selected from among said plurality of interface units, each one operation buffer being connected to at least one processor unit selected from among said plurality of processor units; and receiving and transmitting said first message data, said receiving and transmitting being performed by a first message passing unit selected from a plurality of message passing units, said first message passing unit being connected to said at least one reporting buffer and to said at least one operation buffer, said first message passing unit receiving said first message data from said first interface unit, said first message passing unit transmitting said first message data to one selected from among said at least one reporting buffer, said at least one operation buffer, and said second interface unit.

22. The method of claim 21, wherein said first message passing unit performs said transmitting of said first message data to one selected from among said at least one reporting buffer, said at least one operation buffer, and said second interface unit in accordance with said intercommunication signals, data signals, address signals, and control signals.

23. The method of claim 22, wherein said first message passing unit reads a header of second message data received from said first interface unit, transmits said second message data to one selected from among said at least one operation buffer and said second interface unit when said second message data corresponds to a predetermined valid data, and transmits third message data from said at least one reporting buffer to said second interface unit when said second message data does not correspond to said predetermined valid data.

24. The method of claim 23, wherein said intercommunication signals further comprise initialization signals and start signals transmitted from said first interface unit, and ready signals received by said first interface unit.

25. The method of claim 24, wherein said receiving and transmitting of said intercommunication signals comprise the steps of:

said first interface unit transmitting said initialization signal to said source processor unit;

said first interface unit transmitting said start signal to said source processor unit; and said first interface unit receiving said ready signal from said source processor unit.

26. The method of claim 25, wherein said intercommunication signals correspond to handshake signals.

27. The method of claim 21, wherein said first message passing unit reads a header of second message data received from said first interface unit, transmits said second message data to one selected from among said at least one operation buffer and said second interface unit when said second message data corresponds to a predetermined valid data, and transmits third message data from said at least one reporting buffer to said second interface unit when said second message data does not correspond to said predetermined valid data.

28. The method of claim 21, wherein said intercommunication signals further comprise initialization signals and start signals transmitted from said first interface unit, and ready signals received by said first interface unit.

29. The method of claim 28, wherein said receiving and transmitting of said intercommunication signals comprise the steps of:

said first interface unit transmitting said initialization signal to said source processor unit;

said first interface unit transmitting said start signal to said source processor unit; and said first interface unit receiving said ready signal from said source processor unit.

30. The method of claim 21, wherein said intercommunication signals correspond to handshake signals.

* * * * *